United States Patent
Trush et al.

(10) Patent No.: US 9,068,649 B2
(45) Date of Patent: Jun. 30, 2015

(54) GEAR AND MODE SELECTION FOR TRANSMISSIONS USING A SINGLE INPUT DEVICE

(75) Inventors: Christopher J. Trush, Novi, MI (US); Orson S. Wang, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2100 days.

(21) Appl. No.: 12/182,583

(22) Filed: Jul. 30, 2008

(65) Prior Publication Data

US 2009/0299585 A1 Dec. 3, 2009

Related U.S. Application Data

(60) Provisional application No. 61/057,582, filed on May 30, 2008.

(51) Int. Cl.
| | |
|---|---|
| *G06F 19/00* | (2011.01) |
| *F16H 61/02* | (2006.01) |
| *F16H 59/00* | (2006.01) |
| *F16H 59/08* | (2006.01) |

(52) U.S. Cl.
CPC ...... *F16H 61/0213* (2013.01); *F16H 2059/006* (2013.01); *F16H 2059/082* (2013.01); *F16H 2302/04* (2013.01); *F16H 2312/022* (2013.01); *F16H 2312/02* (2013.01)

(58) Field of Classification Search
CPC . F16H 2312/02; F16H 2312/20; F16H 59/08; F16H 2059/087; F16H 2059/082; F16H 59/0204; F16H 59/044; F16H 2059/0226; F16H 2059/0221; F16H 2059/0239; F16H 2059/0243; F16H 2059/0247
USPC .................................................. 701/52, 62, 64
See application file for complete search history.

(56) References Cited

U.S. PATENT DOCUMENTS

| | | | |
|---|---|---|---|
| 6,383,116 B1 * | 5/2002 | Warren et al. | .................... 477/81 |
| 6,904,822 B2 | 6/2005 | Meyer et al. | |

* cited by examiner

*Primary Examiner* — John Q Nguyen
*Assistant Examiner* — Kyung Kim

(57) ABSTRACT

A transmission of a vehicle has a first gear and a second gear that corresponds to a lower gear ratio than the first gear. A transmission management system for the transmission comprises an enabling module, a shift control module, and a disabling module. The enabling module enables a second gear start mode of the transmission when a vehicle speed is less than a predetermined speed. The shift control module commands operation of the transmission in the second gear when the second gear start mode is enabled. The disabling module selectively disables the second gear start mode when a user commands a gear shift to the first gear while the second gear start mode is enabled and prevents the enabling module from re-enabling the second gear start mode after the second gear start mode is disabled.

16 Claims, 6 Drawing Sheets

GEAR AND MODE SELECTION FOR TRANSMISSIONS USING A SINGLE INPUT DEVICE

CROSS-REFERENCE TO RELATED APPLICATIONS

This application claims the benefit of U.S. Provisional Application No. 61/057,582, filed on May 30, 2008. The disclosure of the above application is incorporated herein by reference in its entirety.

FIELD

The present disclosure relates to vehicle systems and more particularly to vehicle transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 varies airflow into the intake manifold 104. An electronic throttle controller (ETC) 108 actuates the throttle valve 106, thereby controlling opening of the throttle valve 106.

The air mixes with fuel provided by a fuel injector 110 to form an air and fuel mixture. The air/fuel mixture is combusted within cylinders of the engine 102, such as cylinder 112. Combustion may be initiated by, for example, a spark from a spark plug 114. Exhaust gas resulting from combustion is expelled from the cylinder 112 to an exhaust system 116. Combustion of the air/fuel mixture generates torque.

Torque output by the engine 102 is transferred to a transmission 118 via a coupling device 120. The coupling device 120 may include, for example one or more clutches and/or a torque converter. The transmission 118 transfers torque to one or more wheels of the vehicle.

An engine control module (ECM) 130 controls torque output by the engine 102. For example only, the ECM 130 may control torque output by the engine 102 based on driver inputs, such as an accelerator pedal position and/or a brake pedal position. A driver input module 132 receives the driver inputs and transmits the driver inputs to the ECM 130.

The driver input module 132 also receives an indication of the position of a park, reverse, neutral, drive, low (PRNDL) device 134, such as a lever. The driver manipulates the PRNDL device 134 to request operation of the transmission 118 in a desired manner. For example, the driver may manipulate the PRNDL device 134 to operate the transmission 118 in park, reverse, neutral, drive, or low (drive).

Additionally, the driver input module 132 receives gear shift commands from the driver via a gear shift device 136. For example, the gear shift device 136 may include two steering wheel mounted devices (e.g., paddles) that the driver may use to command a gearshift. The driver may command a downshift using one of the devices and an upshift using the other of the devices.

A transmission control module (TCM) 150 controls operation of the transmission 118. For example, the TCM 150 may control shifting of gears included within the transmission 118 and/or operation of the transmission 118 in the desired manner. The TCM 150 may also control the coupling device 120 to allow smooth gear shifts and/or operation of the transmission 118.

SUMMARY

A transmission of a vehicle has a first gear and a second gear that corresponds to a lower gear ratio than the first gear. A transmission management system for the transmission comprises an enabling module, a shift control module, and a disabling module. The enabling module enables a second gear start mode of the transmission when a vehicle speed is less than a predetermined speed. The shift control module commands operation of the transmission in the second gear when the second gear start mode is enabled. The disabling module selectively disables the second gear start mode when a user commands a gear shift to the first gear while the second gear start mode is enabled and prevents the enabling module from re-enabling the second gear start mode after the second gear start mode is disabled.

In other features, the transmission is one of an automatic transmission and a semiautomatic transmission.

In still other features, the disabling module disables the second gear start mode when the user commands a predetermined number of gear shifts to the first gear while the second gear start mode is enabled, wherein the predetermined number is greater than one.

In further features, the disabling module disables the second gear start mode when the user commands the gear shift to the first gear for at least predetermined period of time.

In still further features, the disabling module prevents the enabling module from re-enabling the second gear start mode until the user commands a shift to the second gear while the second gear start mode is disabled.

In other features, the transmission management system further comprises an input module and a mode control module. The input module receives gear shift commands for the transmission from a selection device and receives mode of operation commands for the transmission from the selection device. The mode control module selectively enables one of an automatic mode of operation, a tap mode of operation, and a manual mode of operation for the transmission based on at least one of the gear shift commands and the mode of operation commands.

In still other features, the enabling module enables the second gear start mode when the automatic mode of operation is enabled and the vehicle speed is less than the predetermined speed.

In further features, the gear shift commands and the mode of operation commands are generated based on user manipulations of the selection device.

A transmission of a vehicle has a first gear and a second gear that corresponds to a lower gear ratio than the first gear. A method for the transmission comprises: enabling a second gear start mode of the transmission when a vehicle speed is less than a predetermined speed; commanding operation of the transmission in the second gear when the second gear start mode is enabled; selectively disabling the second gear start mode when a user commands a gear shift to the first gear while the second gear start mode is enabled; and preventing the enabling from re-enabling the second gear start mode after the second gear start mode is disabled.

In other features, the transmission is one of an automatic transmission and a semiautomatic transmission.

In still other features, the selectively disabling comprises disabling the second gear start mode when the user commands a predetermined number of gear shifts to the first gear while the second gear start mode is enabled, wherein the predetermined number is greater than one.

In further features, the selectively disabling comprises disabling the second gear start mode when the user commands the gear shift to the first gear for at least predetermined period of time.

In still further features, the method further comprises preventing the enabling from re-enabling the second gear start mode until the user commands a shift to the second gear while the second gear start mode is disabled.

In other features, the method further comprises: receiving gear shift commands for the transmission from a selection device; receiving mode of operation commands for the transmission from the selection device; and selectively enabling one of an automatic mode of operation, a tap mode of operation, and a manual mode of operation for the transmission based on at least one of the gear shift commands and the mode of operation commands.

In still other features, the enabling comprises enabling the second gear start mode when the automatic mode of operation is enabled and the vehicle speed is less than the predetermined speed.

In other features, the gear shift commands and the mode of operation commands are generated based on user manipulations of the selection device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
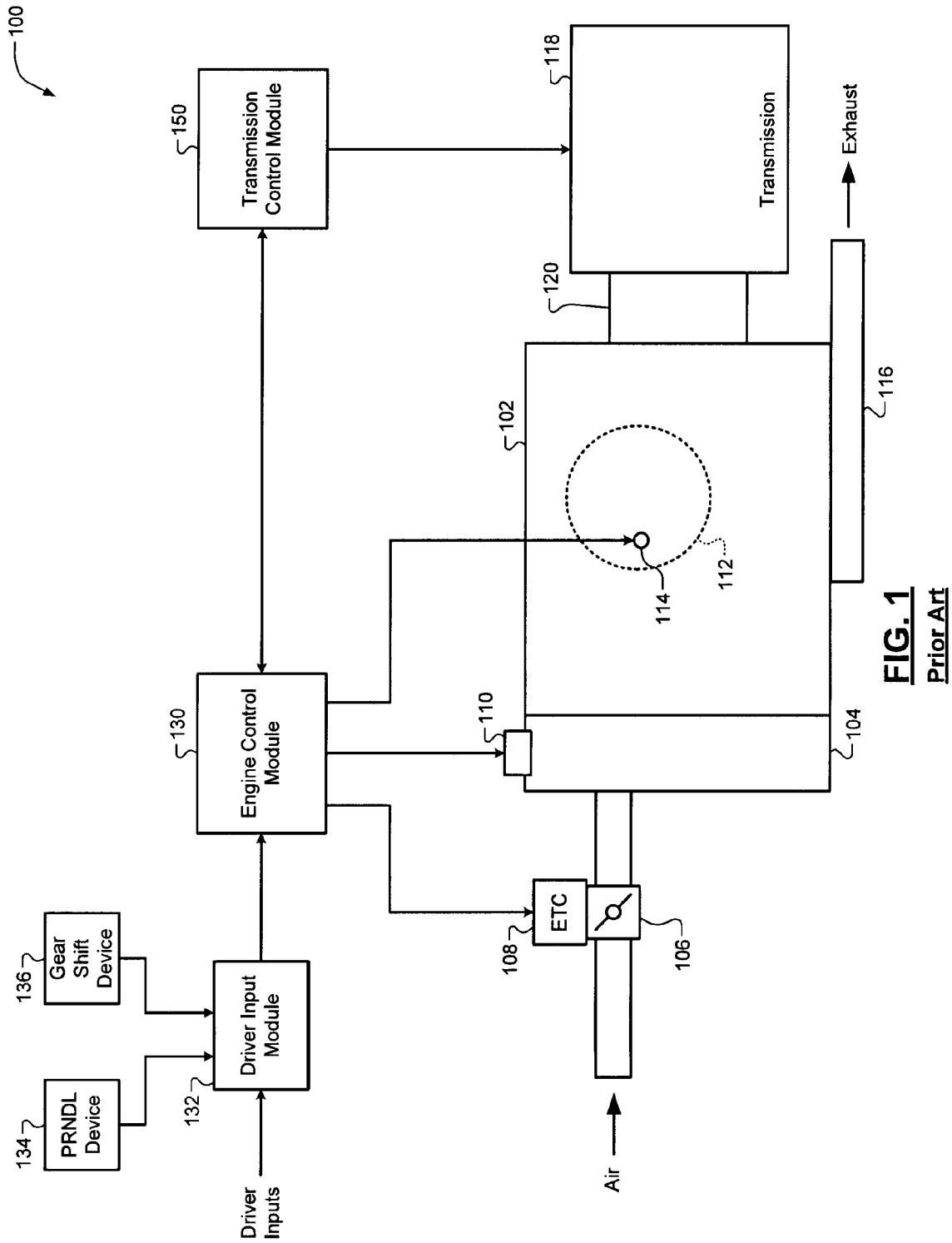
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A transmission management module (TMM) controls operation of a transmission and coordinates gear shifts within the transmission based on a desired mode of operation indicated by a driver and/or gear shifts commanded by the driver. The transmission may be, for example, an automatic transmission or a semiautomatic transmission. The driver indicates the desired mode of operation and commands gear shifts using a selection device located within the vehicle.

The transmission may be operated in an automatic mode, a manual mode, or a tap mode. The transmission management module controls gear shifts based on a shift map while the automatic mode is enabled. If the driver commands a gear shift while the automatic mode is enabled, the transmission management module enables the tap mode and commands the gear shift for a predetermined period of time. If the driver commands operation in the manual mode, the transmission management module enables the manual mode and commands gear shifts as they are commanded by the driver.

The transmission management module may also implement a second gear start mode. The transmission management module commands a second gear to be engaged during low vehicle speed events (i.e., when the vehicle speed is less than a predetermined speed) while the second gear start mode is enabled. Accelerating from the second gear instead of from the first gear increases fuel efficiency.

The vehicle, however, is likely unable to accelerate as quickly as possible while the second gear start mode is enabled. The transmission management module monitors the driver's inputs during low vehicle speed events and selectively disables the second gear start mode based on the driver inputs. For example, the transmission management module may disable the second gear start mode when the driver commands a downshift during a predetermined number of low vehicle speed events.

Referring now to FIG. 1, a functional block diagram of an exemplary engine system 200 is presented. The engine system 200 may be implemented in any suitable type of vehicle, including a hybrid type vehicle. The engine system 200 includes the engine 102 that combusts an air/fuel mixture to produce drive torque. Air is drawn into the intake manifold 104 through the throttle valve 106. The electronic throttle controller (ETC) 108 controls the opening of the throttle valve 106.

An engine control module (ECM) 230 regulates opening of the throttle valve 106 via the ETC 108. In this manner, the ECM 230 controls airflow into the intake manifold 104. Air from the intake manifold 104 is drawn into cylinders of the engine 102. While the engine 102 may include multiple cylinders, for illustration purposes only, only the representative cylinder 112 is shown. For example only, the engine 102 may include 2, 3, 4, 5, 6, 8, 10, and/or 12 cylinders.

The ECM 230 also controls the amount of fuel injected by the fuel injector 110. For example, the ECM 230 may generate a pulse for a predetermined period of time. The fuel injector 110 opens while the pulse is generated. Accordingly, the amount of fuel injected may be adjusted based on the length of the pulse (i.e., the pulse width). The fuel injector 110 may inject fuel into the intake manifold 104 at a central location or at multiple locations, such as near an intake valve that is associated with the cylinder 112. Alternatively, the fuel injector 110 may inject fuel directly into the cylinders. In various implementations, one fuel injector may be provided for each cylinder.

The injected fuel mixes with the air and creates the air/fuel mixture. A piston (not shown) compresses the air/fuel mixture within the cylinder 112. The spark plug 114 is energized, thereby igniting the air/fuel mixture. While the engine 102 is shown as including the spark plug 114, the engine 102 may be any suitable type of engine, such as a compression combustion type engine. In other engine systems, the spark plug 114 may not be necessary to initiate combustion. The byproducts of combustion (i.e., exhaust gas) are expelled from the cylinder 112 to the exhaust system 116.

Combustion of the air/fuel mixture causes the piston to rotatably drive a crankshaft (not shown). An engine speed (EOS) sensor 236 measures the output speed of the engine 102 and generates an EOS signal accordingly. For example only, the EOS sensor 236 may generate the EOS signal based on rotation of the crankshaft.

Torque output by the engine 102 is transferred to an input shaft of the transmission 118 via the coupling device 120. For example only, the coupling device 120 may include a torque converter and/or one or more clutches. The transmission 118 includes one or more gears (not shown) that are selectively engaged to link the input shaft with an output shaft (e.g., a driveshaft) of the transmission 118. The transmission includes any suitable number of gears and may be any suitable type of transmission. For example, the transmission 118 may be an automatic-type transmission. In other implementations, the transmission 118 may be a semiautomatic-type transmission, such as a dual-clutch transmission.

A transmission input speed (TIS) sensor 238 measures the input speed of the transmission 118 and generates a transmission input speed (TIS) signal accordingly. For example only, the TIS sensor 238 may generate the TIS signal based on rotation of the input shaft. A transmission output speed (TOS) sensor 240 measures the output speed of the transmission 118 and generates a TOS signal based on the rotation of the output shaft.

A current gear ratio (i.e., current gear engaged) may be determined based on the ratio of a number of teeth of a gear associated with the input shaft to a number of teeth of a gear associated with the output shaft. In other implementations, the current gear, or the current gear ratio may be determined based on the EOS to the TOS.

A label may be assigned to each of the gears or each of the gear ratios. For example only, a numeric label (e.g., first gear, second gear, etc.) may be assigned to each gear ratio, and the labels may be assigned such that the magnitude of the numerals increases as the gear ratio decreases. In other words, a first gear may correspond to a largest gear ratio, a second gear may correspond to a second largest gear ratio, and so on.

A transmission control module (TCM) 250 may be implemented to control operation of the transmission 118 and/or other vehicle components associated with operation of the transmission 118. For example only, the TCM 250 may control the engaging of the gears within the transmission 118 (i.e., gear shifting) and operation of the transmission 118 in a desired mode or manner. The mode of operation of the transmission 118 may be, for example, automatic, neutral, reverse, park, and/or any other suitable mode of operation.

The ECM 230 controls torque output by the engine 102. For example only, the ECM 230 may control the torque output by adjusting the airflow into the engine, the amount of fuel injected, the spark timing, and/or any other suitable engine parameter. The ECM 230 may control the torque output based on, for example, driver inputs. The driver inputs may include an accelerator pedal position, brake pedal position, and/or any other suitable driver input. The ECM 230 may also control the torque output based on inputs from various sensors (not shown), such as a mass airflow (MAF) sensor, a manifold absolute pressure (MAP) sensor, an intake air temperature (IAT) sensor, a coolant temperature sensor, and/or any other suitable sensor.

A driver input module 232 receives the driver inputs and transmits the driver inputs to the ECM 230. The ECM 230 may transmit any received inputs to the TCM 250. Likewise, the TCM 250 may transmit any received inputs to the ECM 230. For example, the ECM 230 and the TCM 250 may be electrically connected via a bus.

The driver selects the desired mode of operation of the transmission 118 using a selection device 252. The driver also commands gear shifts using the selection device 252. The selection device 252 transmits signals indicating the desired mode of operation of the transmission 118 and gear shift commands to the driver input module 232.

Figure 3:
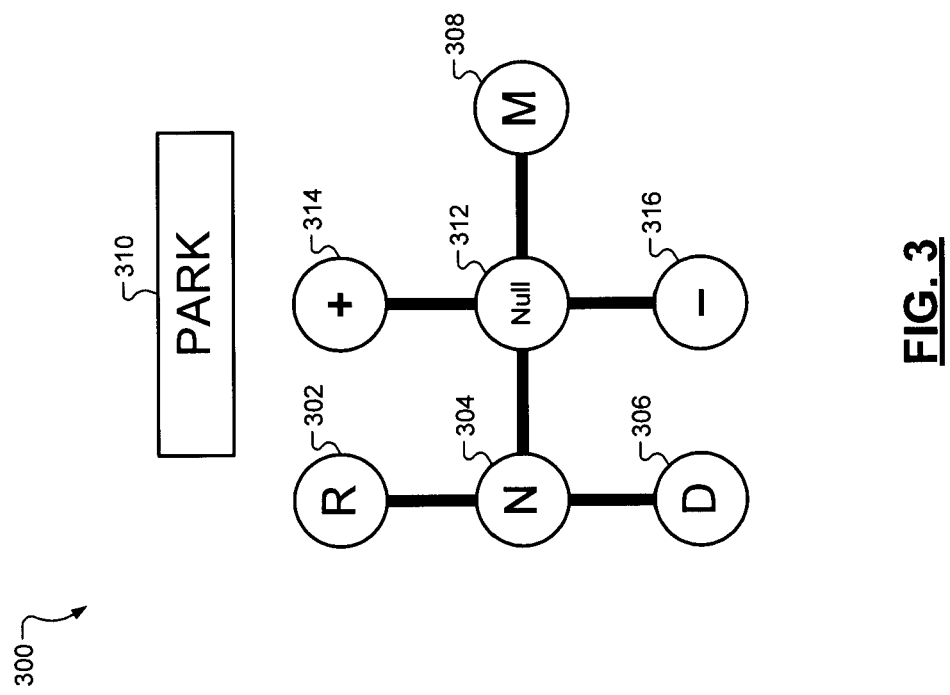
FIG. 3 is a diagram of an exemplary configuration of a selection device according to the principles of the present disclosure.

Referring now to FIG. 3, a diagram of an exemplary configuration 300 for the selection device 252 is presented. While the configuration 300 is presented, the selection device 252 may be configured in any suitable manner. The selection device 252 includes one or more sensors that generate signals based on the driver manipulations of the selection device 252. The selection device 252 may include a mechanical device (not shown), such as a joystick, and/or one or more buttons. While the selection device 252 will be discussed as using the joystick, it should be appreciated that any suitable configuration can be used.

The joystick defaults to a null position 312, which corresponds to no driver input. In other words, the joystick returns to and remains in the null position 312 when the driver is not manipulating the joystick. The driver manipulates the joystick to indicate the desired mode of operation of the transmission 118. For example only, the desired mode of operation of the transmission 118 may be reverse, neutral, automatic, manual, or park.

The transmission 118 may default to park when the engine 102 is started. The driver can thereafter indicate the desired mode of operation by manipulating the joystick to a specified location that corresponds to one of the modes of operation. For example only, the driver may indicate that the desired mode of operation is reverse, neutral, automatic, or manual by manipulating the mechanical device to a reverse (R) location 302, a neutral (N) location 304, a drive (D) location 306, or a manual (M) location 308, respectively. The driver may indicate that the desired mode of operation is park by pressing a park button 310. In other implementations, the driver may indicate that the desired mode of operation is park by manipulating the joystick to a park location (not shown).

In some circumstances, the driver may operate the transmission 118 in the automatic mode. Gear shifts are controlled automatically during operation in the automatic mode. In some circumstances, however, the driver may command a gear shift. For example, the driver may command a downshift (e.g., shift from higher gear to lower gear) to execute a passing maneuver. The driver may command an upshift or a downshift by manipulating the joystick to an upshift (+) location 314 or a downshift (−) location 316, respectively.

In other circumstances, the driver may operate the transmission 118 in the manual mode. The driver may command operation in the manual mode by manipulating the joystick to the manual location 308. During operation in the manual mode, the driver controls gear shifts within the transmission 118. For example, the driver may command an upshift or a downshift by manipulating the joystick to the upshift location 314 or the downshift location 316. During operation in the manual mode, the driver may exit the manual mode and enter the automatic mode by manipulating the joystick to the manual location 308.

Referring again to FIG. 2, the engine system 200 includes a transmission management module (TMM) 260 that controls the mode of operation of the transmission 118 and gear shifting within the transmission 118. The TMM 260 controls the mode of operation and gear shifting based on the driver inputs.

Figure 2:
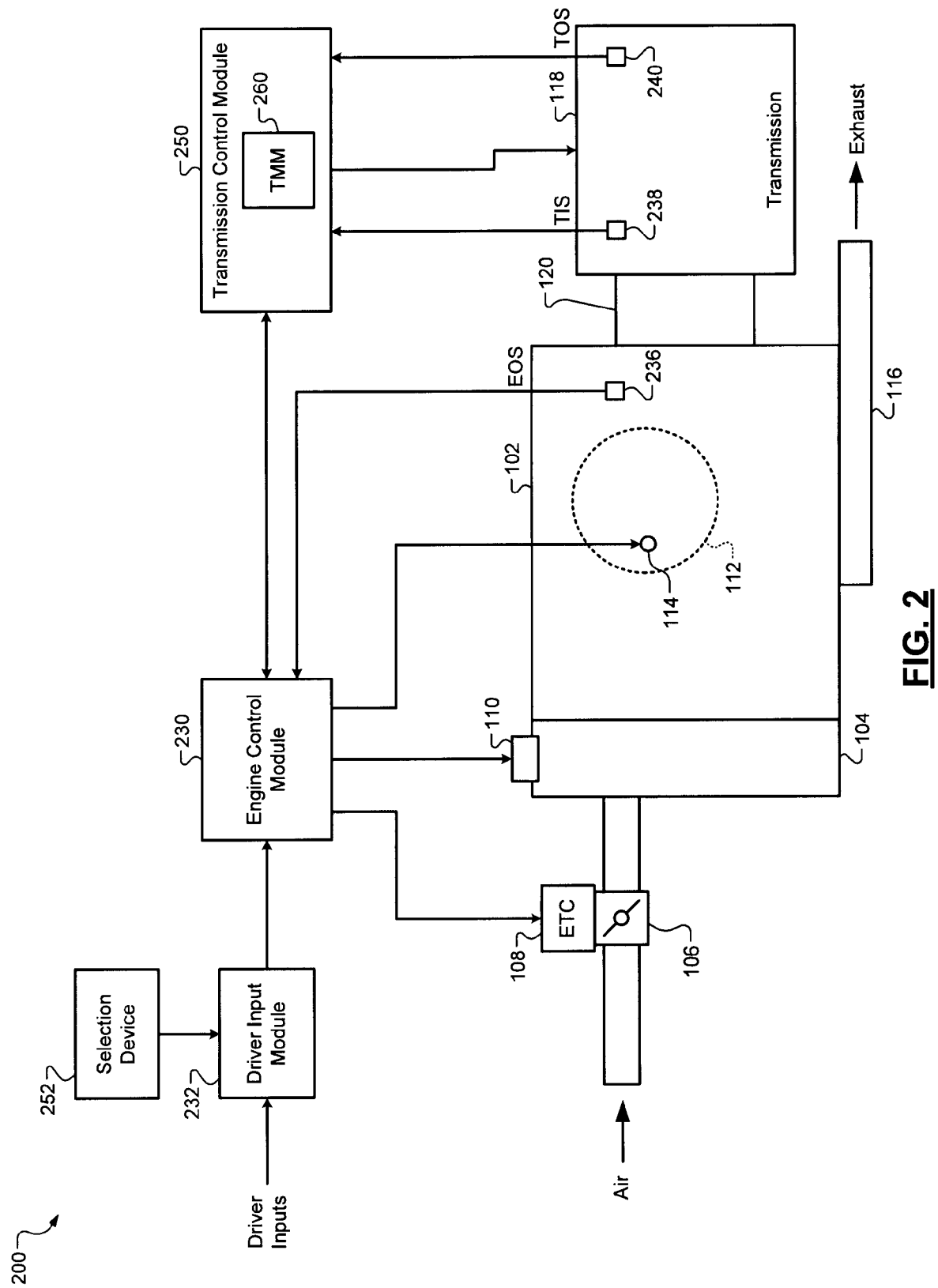
FIG. 2 is a functional block diagram of an exemplary engine system according to the principles of the present disclosure.

More specifically, the TMM 260 controls the mode of operation and/or gear shifting based on the desired mode of operation indicated by the driver and/or driver commanded gear shifts. While the TMM 260 is shown in FIG. 2 as being located within the TCM 250, the TMM 260 may be located in any suitable location. For example only, the TMM 260 may be located within the ECM 230, within any other suitable module, or outside of both the TMM 260 and the ECM 230.

Figure 4:
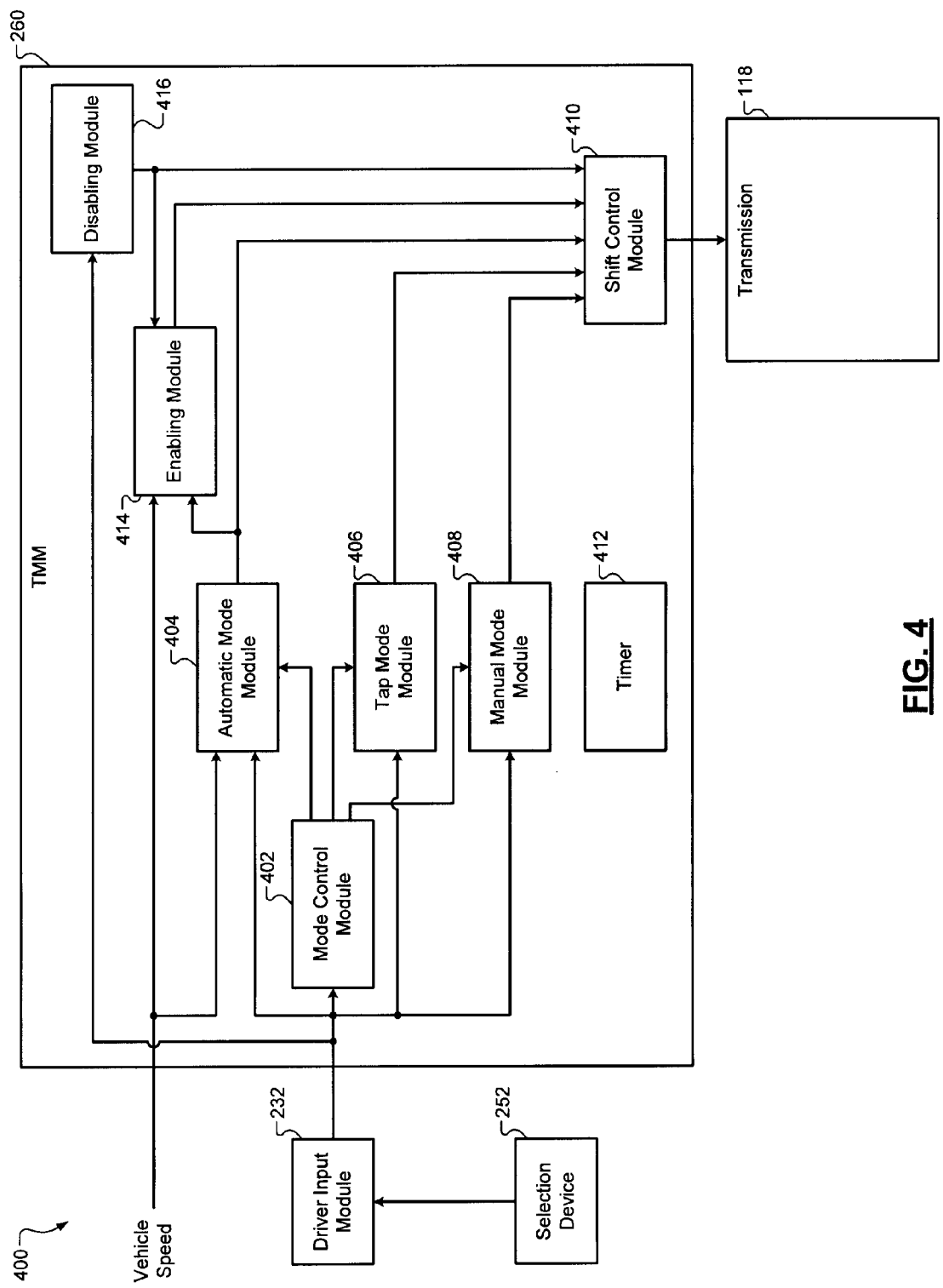
FIG. 4 is a functional block diagram of an exemplary transmission management module according to the principles of the present disclosure.

Referring now to FIG. 4, a functional block diagram of an exemplary implementation of a transmission management system 400 including the TMM 260 is presented. The TMM 260 includes a mode control module 402, an automatic mode module 404, a tap mode module 406, and a manual mode module 408. The TMM 260 also includes a shift control module 410 and one or more timers, such as timer 412.

The mode control module 402 controls the mode of operation of the transmission 118 based on the driver inputs. For example only, the mode control module 402 may enable one or more of the automatic mode module 404, the tap mode module 406, and the manual mode module 408 based on the driver inputs. In other words, the mode control module 402 may enable one of the modules control of gear shifting. As stated above, the driver inputs may include the desired mode of operation and/or commanded gear shifts (i.e., taps). The mode control module 402 receives gear shift commands and transmits the gear shift commands to the appropriate module.

The mode control module 402 enables the automatic mode module 404 when the desired mode of operation is the automatic mode. The automatic mode module 404 then controls gear shifting within the transmission 118. For example only, the automatic mode module 404 may control gear shifting based on a shift map. The automatic mode module 404 may use the shift map along with the driver inputs (e.g., accelerator pedal position), operating parameters, and/or any other suitable parameters to determine timing of gear shifts, which gear to engage, and/or any other suitable parameter.

During operation in the automatic mode, the driver may occasionally command a gear shift using the selection device 252. When the driver commands such a gear shift, the driver may be said to be commanding operation of the transmission 118 in a tap mode (i.e., a tap range mode). For example, the driver may command a downshift (e.g., from a higher gear to a lower gear) when operating in the automatic mode to execute a passing maneuver. The mode control module 402 enables the tap mode module 406 when the driver commands a gear shift while the automatic mode is enabled. The mode control module 402 also transmits the commanded gear shift to the tap mode module 406.

The tap mode module 406 commands a gear shift according to the driver commanded gear shift. The tap mode module 406 then commands that the current gear (i.e., the gear engaged after the commanded gear shift is executed) be maintained for a predetermined period of time or until predetermined conditions are met. The tap mode module 406 may set the timer 412 based on the predetermined period. For example only, the predetermined period may be 2.0 s. Maintenance of the current gear may also be conditioned based on any suitable parameter, such as vehicle speed and/or accelerator pedal position. The vehicle speed may be determined based on any suitable measure of vehicle speed, such as from a wheel speed sensor (not shown) and/or the TOS.

During the time that the current gear is being maintained, the tap mode module 406 monitors the driver inputs for another gear shift command (i.e., a second gear shift command). The tap mode module 406 commands a gear shift based on the second gear shift command if commanded while the current gear is being maintained. The tap mode module 406 also resets the timer 412 when the second gear shift is commanded, and the predetermined period begins running again from the second commanded gear shift.

The mode control module 402 monitors the timer 412 and disables the tap mode module 406 after the predetermined period or upon occurrence of the predetermined conditions. In other words, the mode control module 402 re-enables the automatic mode after the predetermined period or upon the occurrence of the predetermined conditions.

In some circumstances, the driver may indicate a desire to enter the manual mode and manually control gear shifts. Operation in the manual mode may also be referred to as a tap gear mode. The mode control module 402 enables the manual mode module 408 when the driver indicates that the desired mode of operation is the manual mode. For example, the driver may indicate that the desired mode of operation is the manual mode by manipulating the mechanical device of the selection device 252 to the manual (M) location 308.

The manual mode module 408 commands maintenance of the current gear and commands gear shifts when commanded by the driver. The mode control module 402 monitors the driver inputs and re-enables the automatic mode when the driver again indicates that the desired mode of operation is the manual mode. The mode control module 402 may also re-enable the automatic mode when the driver indicates that the desired mode of operation is the automatic mode.

The shift control module 410 receives gear shift commands from the automatic mode module 404, the tap mode module 406, and the manual mode module 408. The shift control module 410 executes the commanded gear shifts within the transmission 118. For example only, the shift control module 410 may control actuation of one or more mechanical devices (e.g., a solenoid and/or a series of clutches) that control engaging and disengaging of the gears within the transmission 118.

The shift control module 410 may also determine current gear information, such as the current gear or current gear ratio engaged. Such information may be determined based on, for example, the EOS and the TOS. The shift control module 410 may also control the coupling device 120 to coordinate a gear shift.

The shift control module 410 module 404 employs one or more modes of operation for the automatic mode that are aimed at maximizing fuel efficiency. For example, the shift control module 410 implements a second gear start mode. The shift control module 410 commands operation of the transmission 118 in the second gear when the second gear start mode is enabled.

An enabling module 414 selectively enables the second gear start mode when the vehicle speed is low. In other words, the enabling module 414 enables the second gear start mode when the vehicle speed is less than a predetermined speed, such as 10.0 miles per hour, including times when the vehicle is stopped (i.e., vehicle speed is zero). If the second gear start mode was not enabled under such conditions, the shift control module 410 commands operation of the transmission 118 in the first gear. Fuel efficiency is increased when the vehicle accelerates from the second gear.

The increase in fuel efficiency that the second gear start mode provides comes at a cost—a decrease in the ability to accelerate as quickly as possible. Accordingly, under some circumstances, the driver may wish to disable the second gear start mode and accelerate from the first gear. A disabling module 416 monitors the driver inputs and selectively disables the second gear start mode based on the driver inputs.

More specifically, the disabling module 416 selectively disables the second gear start mode based on the driver inputs received while the second gear start mode is enabled. For example only, the disabling module 416 disables the second gear start mode when the driver commands a downshift (i.e., to the first gear) at least a predetermined number of times (e.g., eight) during a predetermined number of low vehicle speed events (e.g., ten).

The disabling module 416 also disables the second gear start mode when the driver maintains the selection device 252 in the downshift location 316 for a predetermined period of time (e.g., three seconds) while the vehicle speed is low. In other words, the disabling module 416 disables the second gear start mode when the driver commands a downshift for at least the predetermined period of time while the vehicle speed is low.

The disabling module 416 also prevents the enabling module 414 from re-enabling the second gear start mode after the second gear start mode is disabled. However, the driver may wish to re-enable the second gear start mode under some circumstances. The disabling module 416 prevents the enabling module 414 from re-enabling the second gear start mode until the driver commands re-enabling of the second gear start mode. For example only, the disabling module 416 may re-enable the second gear start mode when the driver commands one or more upshifts while the second gear start mode is enabled and the vehicle speed is low. The enabling module 414 thereafter enables the second gear start mode when the vehicle speed is low.

Figure 5A:
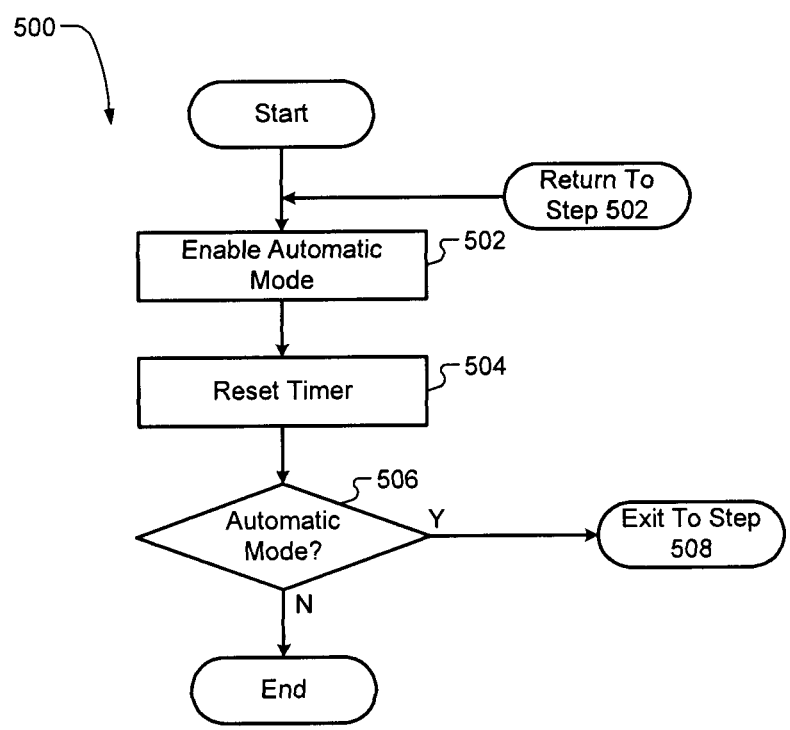
FIGS. 5A-5B are flowcharts depicting exemplary steps performed by the transmission management module according to the principles of the present disclosure.
Figure 5B:
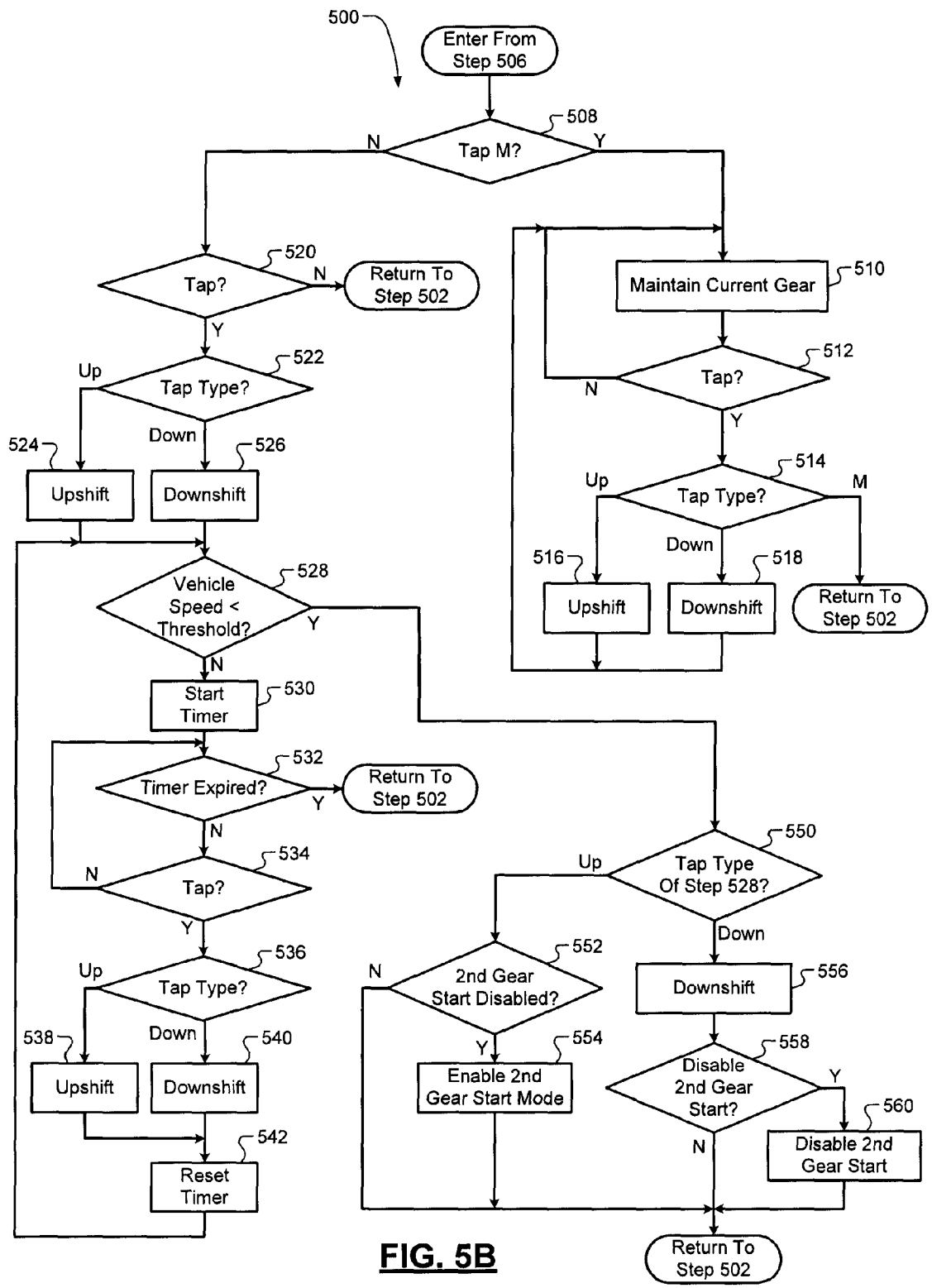

Referring now to FIGS. 5A-5B, method 500 depicting exemplary steps performed by the TMM 260 are presented. Control begins in step 502 where control enables the automatic mode. When the automatic mode is enabled the first time that step 502 is performed (after engine startup), the second gear start mode is also enabled. The state of the second gear start mode remains unchanged during later performances of step 502.

Control continues in step 504 where control resets the timer. In step 506, control determines whether the automatic mode is enabled. If true, control transfers to step 508; otherwise, control ends. In other words, if the automatic mode is enabled in step 506, control exits FIG. 5A and proceeds to step 508 of FIG. 5B.

Referring now to FIG. 5B, control determines whether the driver has tapped M (i.e., the manual mode) in step 508. If true, control continues to step 510; otherwise, control transfers to step 520. In other words, control disables the automatic shift mode and enables the manual shift mode when the driver commands operation in the manual shift mode. In step 510, control maintains the current gear.

In step 512, control determines whether the driver has tapped the selection device 252 (i.e., commanded a gear shift or a change in the mode of operation). If true, control continues to step 514; otherwise, control returns to step 510. In step 514, control determines the type of the tap (of step 512). If the tap was an upshift (+), control proceeds to step 516. If the tap was a downshift (−), control proceeds to step 518. If the tap was a manual mode (M) tap, control returns to step 502 and re-enables the automatic mode. In steps 516 and 518, control commands an upshift and a downshift, respectively. After control performs either step 516 or 518, control returns to step 510.

Referring again to step 520, control determines whether the driver has tapped the selection device 252. If true, control continues to step 522; otherwise control returns to step 502 and re-enables the automatic mode. If the driver has tapped the selection device 252 in step 520, control enables the tap mode and disables the automatic mode.

In step 522, control determines the type of the tap (of step 520). If the tap of step 520 was an upshift, control proceeds to step 524. If the tap of step 520 was a downshift, control proceeds to step 526. In steps 524 and 526, control commands an upshift and a downshift, respectively. Control continues to step 528 after control performs either step 524 or 526.

In step 528, control determines whether the vehicle speed is less than a threshold. If true, control transfers to step 550; otherwise, control continues in step 530. In step 530, control starts the timer. The timer is set based on a predetermined period of time. This predetermined period of time may be calibratable and may be set to, for example, 2.0 s.

In step 532, control determines whether the timer has expired. If true, control returns to step 502 and re-enables the automatic mode; otherwise, control continues to step 534 and the tap mode remains enabled. In step 534, control determines whether the driver has tapped the selection device 252 again (i.e., commanded a second gear shift). If so, control continues to step 536; otherwise, control returns to step 532.

In step 536, control determines the type of the tap (of step 534). If the tap of step 534 was an upshift, control proceeds to step 538. Otherwise, if the tap was a downshift, control proceeds to step 540. In steps 538 and 540, control commands an upshift and a downshift, respectively. In other words, if the driver commands a second gear shift within the predetermined period of time after the first gear shift command, control remains in the tap mode and commands the driver commanded gear shift. Control proceeds to step 542 after control performs either step 538 or 540. In step 542, control resets the timer. In this manner, control allows another predetermined period of time after the second gear shift command. Control then returns to step 528.

Referring again to step 550 (i.e., when the vehicle speed is less than a predetermined speed and a gear shift is commanded), control determines the tap type of step 520. If the tap of step 520 was an upshift, control proceeds to step 552. If, however, the tap of step 520 was a downshift, control proceeds to step 556.

In step 552, control determines whether the second gear start mode is currently disabled. If true, control proceeds to step 554; otherwise, control returns to step 502 and re-enables the automatic mode. In step 554, control re-enables the second gear start mode, and control returns to step 502. In other words, control enables the second gear start mode if the driver commands an upshift while the vehicle speed is low and the second gear start mode is disabled.

Referring again to step 556 (i.e., where the tap of step 520 was a downshift), control commands the driver commanded downshift. Control then continues in step 558 where control determines whether the second gear start mode should be disabled. If true, control disables the second gear start mode in step 560; otherwise, control returns to step 502 and re-enables the automatic mode. Control also returns to step 502 after control performs step 560. Control may determine that the second gear start mode should be disabled when, for example, the driver has commanded a downshift at least a predetermined number of times (e.g., eight) during the last predetermined number of low vehicle speed events (e.g., ten).

Control may also disable the second gear start mode when the driver maintains the selection device 252 in the downshift location 316 for a predetermined period of time (e.g., 3.0 s).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A transmission management system for a transmission of a vehicle, wherein said transmission has a first gear and a second gear that corresponds to a lower gear ratio than said first gear, the transmission management system comprising:
   an enabling module that enables a second gear start mode of said transmission when a vehicle speed is less than a predetermined speed;
   a shift control module that commands operation of said transmission in said second gear when said second gear start mode is enabled; and
   a disabling module that selectively disables said second gear start mode when a user commands a first predetermined number of gear shifts to said first gear within a second predetermined number of different periods when said vehicle speed is less than said predetermined speed while said second gear start mode is enabled and that prevents said enabling module from re-enabling said second gear start mode after said second gear start mode is disabled,
   wherein said second predetermined number is an integer greater than one, and
   wherein said first predetermined number is an integer greater than one and less than or equal to said second predetermined number.

2. The transmission management system of claim 1 wherein said transmission is one of an automatic transmission and a semiautomatic transmission.

3. The transmission management system of claim 1 wherein said disabling module disables said second gear start mode when said user commands said gear shift to said first gear for at least predetermined period of time.

4. The transmission management system of claim 1 wherein said disabling module prevents said enabling module from re-enabling said second gear start mode until said user commands a shift to said second gear while said second gear start mode is disabled.

5. The transmission management system of claim 1 further comprising:
   an input module that receives gear shift commands for said transmission from a selection device and that receives mode of operation commands for said transmission from said selection device; and
   a mode control module that selectively enables one of an automatic mode of operation, a tap mode of operation, and a manual mode of operation for said transmission based on at least one of said gear shift commands and said mode of operation commands.

6. The transmission management system of claim 5 wherein said enabling module enables said second gear start mode when said automatic mode of operation is enabled and said vehicle speed is less than said predetermined speed.

7. The transmission management system of claim 5 wherein said gear shift commands and said mode of operation commands are generated based on user manipulations of said selection device.

8. The transmission management system of claim 1 wherein said first predetermined number is equal to 8 and wherein said second predetermined number is equal to 10.

9. A method for a transmission of a vehicle, said transmission having a first gear and a second gear that corresponds to a lower gear ratio than said first gear, the method comprising:
   enabling a second gear start mode of said transmission when a vehicle speed is less than a predetermined speed;
   commanding operation of said transmission in said second gear when said second gear start mode is enabled;
   selectively disabling said second gear start mode when a user commands a first predetermined number of gear shifts to said first gear within a second predetermined number of different periods when said vehicle speed is less than said predetermined speed while said second gear start mode is enabled,
   wherein said second predetermined number is an integer greater than one, and
   wherein said first predetermined number is an integer greater than one and less than or equal to said second predetermined number; and
   preventing said enabling from re-enabling said second gear start mode after said second gear start mode is disabled.

10. The method of claim 9 wherein said transmission is one of an automatic transmission and a semiautomatic transmission.

11. The method of claim 9 wherein said selectively disabling comprises disabling said second gear start mode when said user commands said gear shift to said first gear for at least predetermined period of time.

12. The method of claim 9 further comprising preventing said enabling from re-enabling said second gear start mode until said user commands a shift to said second gear while said second gear start mode is disabled.

13. The method of claim 9 further comprising:
   receiving gear shift commands for said transmission from a selection device;
   receiving mode of operation commands for said transmission from said selection device; and
   selectively enabling one of an automatic mode of operation, a tap mode of operation, and a manual mode of operation for said transmission based on at least one of said gear shift commands and said mode of operation commands.

14. The method of claim 13 wherein said enabling comprises enabling said second gear start mode when said automatic mode of operation is enabled and said vehicle speed is less than said predetermined speed.

15. The method of claim 13 wherein said gear shift commands and said mode of operation commands are generated based on user manipulations of said selection device.

16. The method of claim 9 wherein said first predetermined number is equal to 8 and wherein said second predetermined number is equal to 10.

* * * * *